United States Patent [19]
Böttcher

[11] Patent Number: 4,609,221
[45] Date of Patent: Sep. 2, 1986

[54] PIVOTING REAR SEAT ARRANGEMENT

[75] Inventor: Curd Böttcher, Büttelborn, Fed. Rep. of Germany

[73] Assignee: General Motors Corporation, Detroit, Mich.

[21] Appl. No.: 592,447

[22] Filed: Mar. 22, 1984

[30] Foreign Application Priority Data

Apr. 2, 1983 [DE] Fed. Rep. of Germany ....... 3312118

[51] Int. Cl.⁴ .............................................. B60N 1/06
[52] U.S. Cl. ................................... 296/65 R; 297/553; 297/383
[58] Field of Search .................... 296/63, 64, 65 R, 69; 297/257, 350, 353, 383

[56] References Cited

U.S. PATENT DOCUMENTS

| 3,054,641 | 9/1962 | Smith | 297/383 |
| 4,376,552 | 3/1983 | Pilhall | 296/69 |
| 4,475,763 | 10/1984 | Hamatani et al. | 296/65 R |

FOREIGN PATENT DOCUMENTS 381980 10/1932 United Kingdom ................ 297/383

Primary Examiner—David A. Scherbel
Assistant Examiner—Dennis H. Pedder
Attorney, Agent, or Firm—Charles F. Leahy

[57] ABSTRACT

In a split rear seat arrangement, a pair of seat backs are mounted for pivoting movement about an upwardly extending pivot axis. This arrangement provides that the seat backs, rather than being tilted forwardly onto the floor panel, are adapted for sideward swinging movement to a point where they abut against the side panel of the motor vehicle.

1 Claim, 4 Drawing Figures

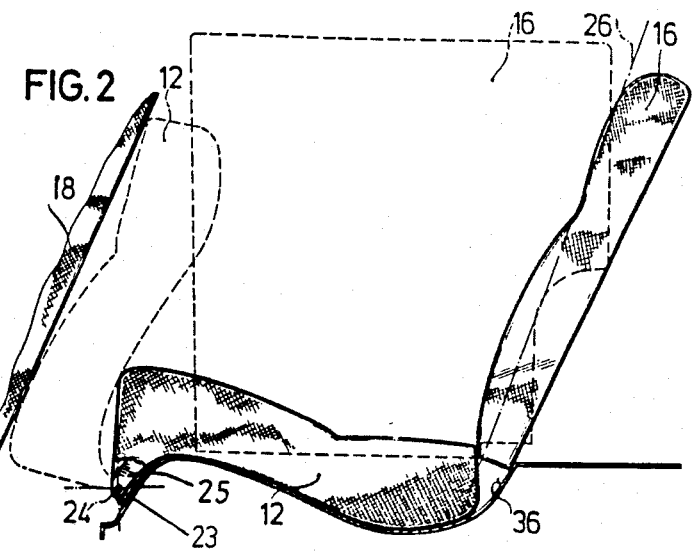
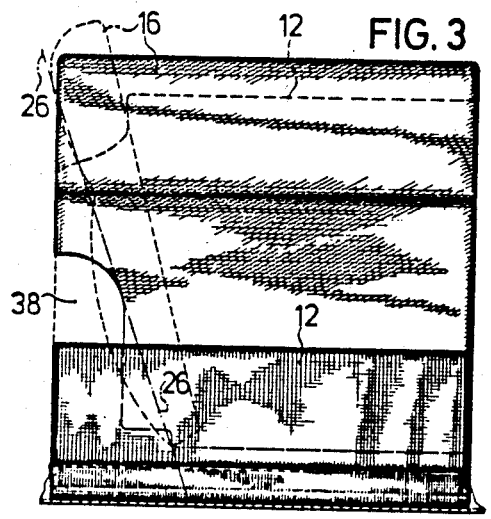
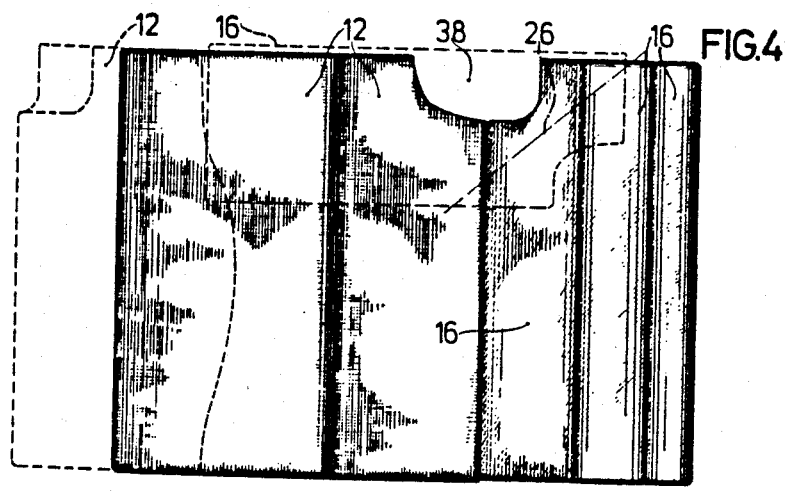

PIVOTING REAR SEAT ARRANGEMENT

The invention relates to a rear seat arrangement for motor vehicles and more particularly to a rear seat in which the seat cushion pivots forward to a fold-away position and the split seat back portions pivot sideways against the side of the vehicle to increase cargo space.

BACKGROUND OF THE INVENTION

It is known to provide vehicle rear seats in which the seat cushions are adapted for upward tilting movement about a front edge and wherein the seat back is of the split type and is tiltable from a normal position to a fold-away position for increasing the cargo space of the vehicle. These types of rear seat arrangements are generally known in the art and Hamatani et al 4,475,763 issued Oct. 9, 1984 is an example.

In this prior art rear seat arrangement, the seat cushion as well as the seat back are adapted for tilting movement about a transverse axis. Each seat back portion is pivotally mounted to the vehicle floor and is provided near its upper edge with a pin adapted for latching engagement with a catch provided on the side of the vehicle. In present day vehicles provided with rear seat shoulder belts, the seat belt straps extend laterally of the seat back portions and in close proximity of the seat back latching mechanisms. Consequently, there is always the possibility that, upon tilting movement of the seat back portions, the straps will be picked up by the latching pins projecting out of the back seat portions and caught in the latching mechanisms.

It is the object of the present invention to provide a rear seat arrangement of the foregoing type in which the seat back portion can be moved into a fold-away position without interferring with the seat belts. This objective is achieved in accordance with the invention in that each seat back portion is mounted for pivoting movement about an upwardly extending pivot axis provided on or near the side panel of the vehicle.

SUMMARY OF THE INVENTION

In the rear seat arrangement according to the present invention the seat back portions, rather than being tilted downwardly about a transverse axis, as was usual with prior art arrangements, are swung sideways in a door-like fashion about an upwardly extending pivot axis so as to move into abutment against the side panels of the vehicle. Therefore, the seat back portions are not caused to move past the seat belt straps, and the possibility of the straps interferring with the seat backs is eliminated.

Since the seat backs are swung sideways, the full height of the cargo space, i.e., from the vehicle floor panel to the vehicle roof, is available. The width of the cargo space is not affected by the seat back portions inasmuch as they are positioned right ahead of the wheel enclosures, so that the usable width of the cargo space is usually reduced only to the extent that it is already reduced by the wheel enclosures.

In one advantageous configuration of the invention, the pivot axis is, when viewed from a point located sideways of the seat, extending inside the seat back upholstery in accordance with the inclination of the seat back portion. This arrangement permits easy attachment of the hinges, because the hinges are mounted to the seat back portions in the proximity of the side surfaces of the seat backs.

Inasmuch as the seat back portions are inclined rearwardly at a slight angle when in their normal position, their upper edges would, when the seat back portions are swung sidewardly to their fold-away position, be angled upwardly if the pivot axis were to extend parallel to the side panel, an arrangement which, in terms of appearance, is not desirable. Furthermore, the respective wheel enclosure would prevent the seat back from being completely moved to the side. In accordance with the arrangement of the invention, the pivot axes are, when viewed from a point above or ahead of the seat, slightly inclined toward the center of the vehicle. This will cause the seat back portions, when in their fold-away position, to be also slightly inclined when abutting against the side panels, i.e., their upper portion will be abutting against the side panels and their lower portion will be spaced at a distance therefrom. The space thus created may be occupied by the wheel enclosures. In addition, the inclined position of the pivot axes will cause the upper edge of the seat back portions, when the seat backs are in the fold-away position, to extend horizontally.

Another favorable aspect of the invention is that the seat cushions, when in their normal position, are located in the pivoting path of the seat back portions. This will accomplish that the seat cushions, when in the normal position on the vehicle floor, prevent the seat backs from being moved about their pivoting axis, thereby eliminating the need for any latching means for the seat back portions.

If, as is usual with ordinary vehicles such as shown in FIGS. 4 and 5 of Hamatani et al U.S. Pat. No. 4,475,763, the seat backs are folded down to the vehicle floor panel, the upper edges of the seat back will come to be located adjacent the upwardly tilted seat cushions. Therefore, the headrests attached to the seat backs must be removed before the seat backs can be folded down because there is no extra space available in front of the upwardly tilted seat cushions. In the seat back arrangement according to the invention, the headrests do not present any problem when moving the seat backs to their fold-away position and may therefore be rigidly attached to the seat backs.

The invention permits numerous configurations. One exemplary embodiment is illustrated in the drawings and described in the following.

DESCRIPTION OF THE DRAWINGS

In the drawings:

FIG. 2 is a schematic side view of the rear seat assembly according to FIG. 1.

FIG. 3 is a front view of the rear seat assembly according to FIG. 1 and FIG. 2.

FIG. 4 is a plan view of the rear seat arrangement according to FIGS. 1-3.

DESCRIPTION OF THE PREFERRED EMBODIMENT

Figure 1:
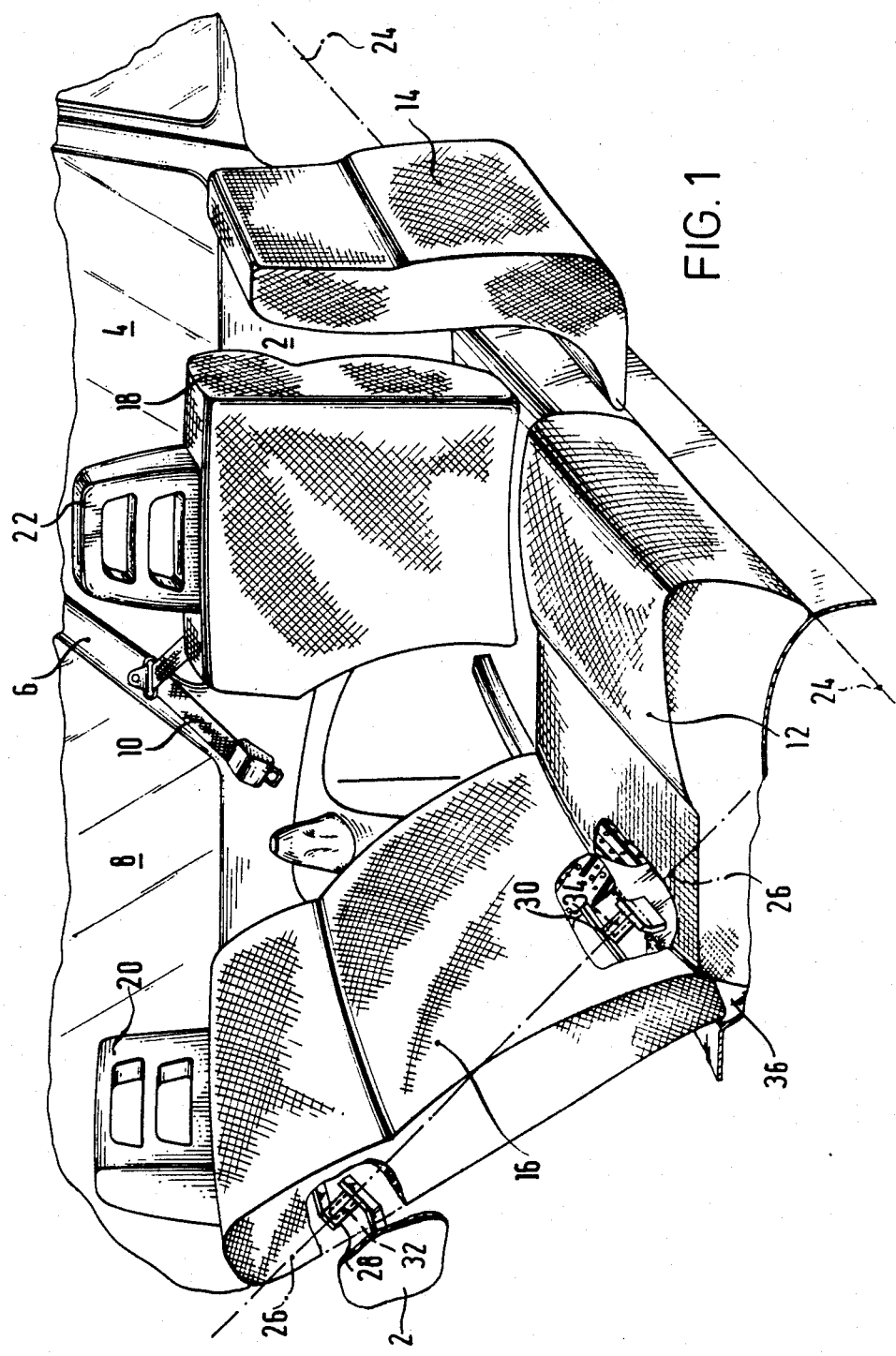
FIG. 1 is a three-dimensional representation of the subject rear seat assembly in a passenger car.

FIG. 1 is a view into the rear compartment of a motor vehicle. It shows a side panel 2, a side window 4, a rear roof pillar 6 and a rear window 8. A shoulder belt 10 is extending along the rear roof pillar 6.

The rear seat assembly of the motor vehicle includes two fold-away seat cushions 12, 14 and two fold-away seat backs 16, 18. The seat backs 16, 18 are provided with head rests 20, 22, respectively, which are fixedly mounted thereto.

The seat cushions 12, 14 are, as in usual in motor vehicle rear seat assemblies, adapted for swinging movement about a horizontally extending axis 24 defined by a hinge member 23 mounted on the floor and a hinge member 25 mounted on the seat, so as to be moved forwardly into an upright position, which is illustrated for the seat cushion 14. However, unlike conventional rear seat assemblies, the seat backs are mounted for swinging movement about an upright pivot axis 26. This will permit the seat backs to be moved from their normal seating position as shown by seat back 16, to a stored position against the respective side panel 2 as shown by seat back 18.

A pair of hinge-like sockets 28, 30 carried by the seat back 18 are illustrated in FIG. 1. The sockets 28, 30 are adapted for receiving, respectively, pivot pins 32, 34 which are fixedly mounted to the vehicle, such as respectively on the side panel 2 and the floor panel 36. It is apparent in FIG. 1 that the lower socket 30 and the lower pivot pin 34 are displaced towards the midportion of the vehicle, so that the pivot axis 26, while extending within the seat back upholstery, is tilting toward the middle of the vehicle when viewed from a point above and ahead of the seat.

In FIGS. 2 to 4, the path of the pivot axis 26 is illustrated even more clearly. FIG. 2 shows that the inclination of the pivot axis 26, as viewed from a point sideways of the seat, corresponds to the inclination of the seat back 16, and is extending within the upholstery of the seat back. FIG. 2 also illustrates the position of the transverse axis 24, which is provided by hinges, not shown, located at the lower front end of seat cushion 12 and on the floor panel 36. The rear panel of a seat back 18 of a front seat assembly is shown.

In FIG. 2, as well as in FIGS. 3 and 4, the fold-away positions of the seat cushion 12 and the seat back 16, respectively, are indicated in broken lines. The representation in broken lines illustrates that the seat cushion 12 can be tilted about the transverse axis 24 to a point where it abuts against the seat back 18. The seat back 16 can be swung about the pivot axis 26 until it assumes the position indicated in broken lines in FIG. 2.

It is also apparent from FIG. 2 that the seat back 16 cannot be swung out of the way when the seat cushion is positioned on the floor panel 36, i.e., as long as the seat cushion is in its normal position. It is therefore not necessary to provide for special latching means to inhibit pivoting movement of the seat backs 16, 18 that may occur as a result of, for instance, vehicle braking. Nevertheless, latching means may be provided between the seat back portions as a protection against cargo displacement in the trunk compartment that may be caused by unusually high deceleration forces.

FIG. 3 shows a right-hand side wheel enclosure 38. It is apparent that the pivot axis 26 slopes past the wheel enclosure 38. Thus the wheel enclosure 38 is not in the way when the seat back 16 is moved into its fold-away position. It is also apparent that the seat back 16, when folded away, assumes a slanted rather than a vertical position, i.e., its lower portion abuts against the wheel enclosure 38 and its upper portion against the side panel 2. FIG. 3 also shows the seat cushion 12 in its normal position and in its upright position, the latter being indicated in broken lines.

FIG. 4 illustrates all the above-mentioned components in plan view and, in particular, shows the angular position of the pivot axis 26.

The embodiments of the invention in which an exclusive property or priviledge is claimed are defined as follows:

1. In a rear seat arrangement for a motor vehicle of the type including a seat cushion having a normal horizontal position on the vehicle floor defining a seat bottom and hingedly mounted for pivotal movement about an axis at the front end thereof for upward pivotal movement to a vertical stored position against the back of a front seat and having a split seat back having an upper portion and a lower portion and adapted for movement from a normal upright seating position to a stored position so as to provide increased cargo space, the improvement comprising:

upper pivot means acting between the motor vehicle side panel and the upper portion of the seat back and a lower pivot means acting between the vehicle floor and a lower portion of the seat back to define an upwardly extending pivot axis located adjacent the side panel of the vehicle by which the seat back is mounted for swinging movement between the normal upright seating position and upright stored position along the side panel of the vehicle body;

and said seat back having a top edge and having a normal upright seating position in which the top edge is generally horizontal and the seat back angled somewhat rearwardly and the lower pivot means is located both forwardly of the upper pivot means and further inboard from the side panel of the vehicle body so that the upwardly extending pivot axis of seat back swinging movement is inclined both rearwardly and outwardly whereby the top edge of the seat back maintains a generally horizontal attitude when swingingly moved to the stored position along the side panel of the vehicle body.

* * * * *